Jan. 7, 1969  J. K. MOYER ET AL  3,421,131
THERMOSTAT ASSEMBLY
Filed June 5, 1967
FIG./
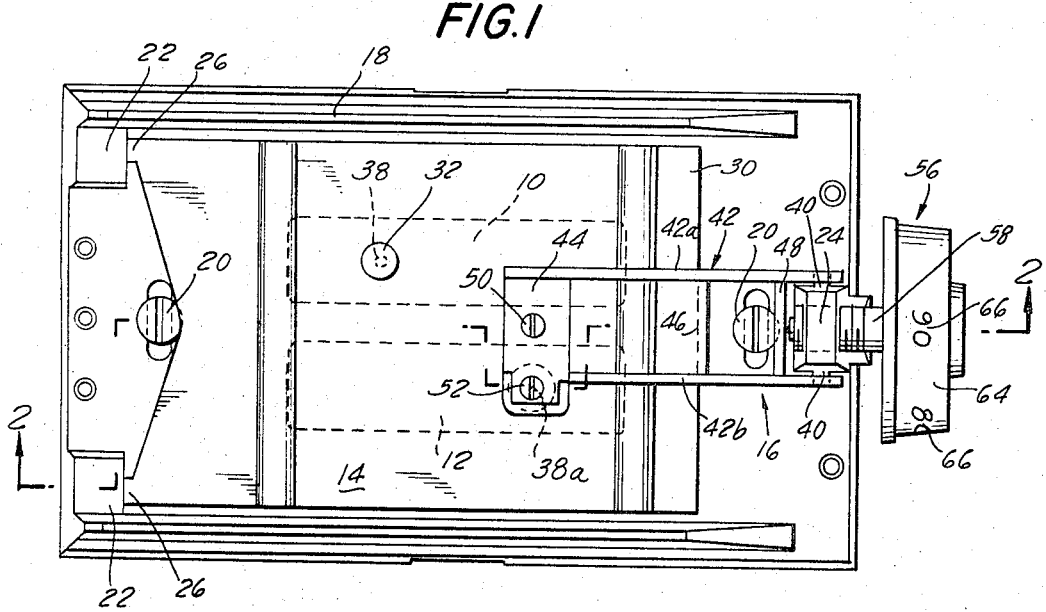
FIG.2
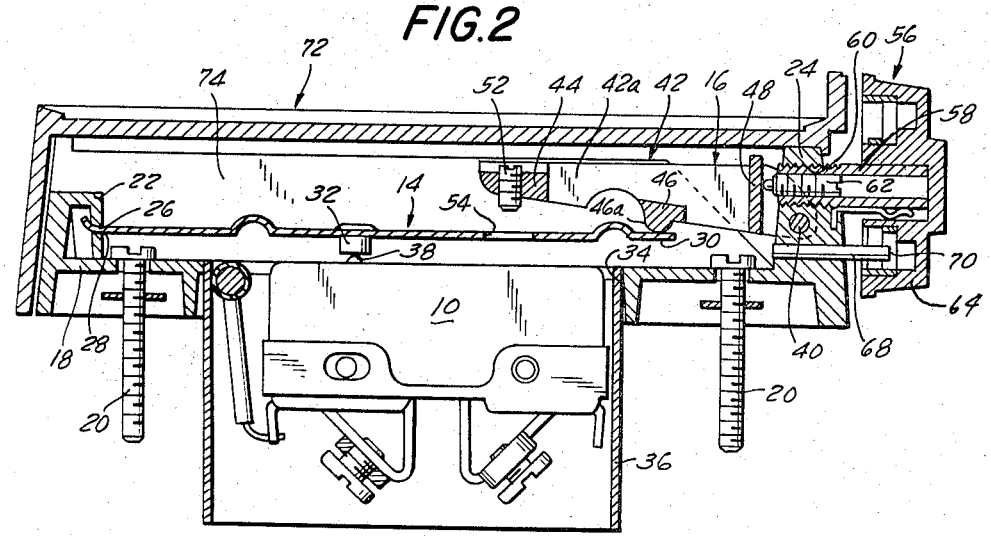
FIG.3
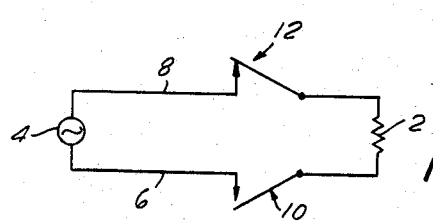
INVENTORS
JOSEPH K. MOYER
ROBERT N. LEVINN
BY
ATTORNEYS

United States Patent Office 3,421,131
Patented Jan. 7, 1969

3,421,131
THERMOSTAT ASSEMBLY
Joseph K. Moyer and Robert N. Levinn, Catskill, N.Y., assignors to American Thermostat Corporation, South Cairo, N.Y., a corporation of New York
Filed June 5, 1967, Ser. No. 643,680
U.S. Cl. 337—338                                    25 Claims
Int. Cl. H01h 37/52

ABSTRACT OF THE DISCLOSURE

Means are provided in a bimetal thermostat assembly for adjusting the initial position of the bimetal, thereby to control the temperature at which the bimetal actuates one or more switches associated therewith, by means of a movable arm which, in one extreme position, engages the strip at a point such as to reduce the effective bendable length of the strip, and in the same position the arm substantially directly engages a second switch in order to provide added security of circuit control.

---

The present invention relates to a thermostat assembly, and in particular to one adapted to control an external electrical circuit by suitable action on a switch. Means are provided in one extreme adjusted position of the assembly to ensure that the switch will then remain in desired condition, usually an off condition, and also or alternatively to ensure that a second switch is also actuated at that time, thereby to add to the electrical security of the overall system.

Thermostat assemblies generally comprise a temperature-sensitive element such as a bimetal strip, the condition of which changes as different temperatures are sensed, that element in its various changed positions serving to actuate a switch or a plurality of switches which are physically associated therewith, those switches in turn controlling the energization of an external electrical circuit. One such system in connection with which the thermostat assembly of the present invention is particularly applicable for use is a space heating system, where the external electrical circuit, when energized, is effective to heat a room or the like, the thermostat assembly being positioned in the room, usually on a wall thereof, so as to sense the temperature of the room and control the cycling of the heating circuit between on and off conditions in order to maintain that temperature at a desired value. In most instances the particular temperature desired must be adjustable to accord with different climatic conditions, different times of day, or different desires on the part of the individuals involved. Under some circumstances it is desired to turn the heating system off and ensure that it not go on again. Two problems arise in this connection and, depending upon the installation, they may be present simultaneously or individually. One problem has to do with the reliability of the turning-off function. Unless some means are provided for ensuring that the turnoff is relatively positive, a substantial decrease in room temperature may cause the system to turn on again when that is not desired. Secondly, in many installations, for safety reasons, it is desired that both sides of the line feeding the heating system be disconnected therefrom during the off-condition of the system.

The structure and arrangement of the thermostat assembly of the present invention is specially adapted to accommodate and solve either or both of these factors. The structure is further designed to provide for accurate and reliable temperature control over the desired temperature range, and to do this by means of elements which are sturdy, relatively inexpensive, easily manufactured and assembled, readily adjusted and replaced, and at the same time capable of being embodied in an efficient and attractive asembly. The factor of attractiveness is a major one in connection with space heating systems where the thermostat assemblies are to be visibly mounted on a wall of the room or the like.

In accordance with the present invention the housing of the system contains within itself an elongated bimetal which constitutes a temperature-sensitive element of the assembly. The bimetal preferably is in the form of a sheet or strip which is pivotally mounted at a first point at one end thereof and which is free to move at the other end. Intermediate those ends it carries a projection which is adapted to cooperate with and actuate a switch electrically connected in the electrical circuit to the external heating system. The position of the strip will determine whether the switch actuated thereby is open or closed, and thus will determine whether the external heating system is energized or de-energized. Manual adjusting means is provided, accessible at one end of the housing, for controlling the nominal position of the strip and thus determining the particular temperature at which the strip acts to change the status of the switch controlled thereby from on to off or vice versa. This manual adjusting means is designed to engage the strip adjacent its free end and to thus locate or position the free end of the strip in accordance with the desired temperature of switch actuation. In the form specifically disclosed the adjusting means comprises an arm pivotally mounted in the housing and controlled in its position by means of a screw accessible from the outside of the housing, the screw engaging an appropriate abutment on the arm. The arm carries a part which engages the strip at a second point adjacent its free end and positions it as set forth above.

In addition, the arm or other manually adjustable element carries a second part which is normally disengaged from the bimetal strip but which is adapted to engage the strip at a third point located lengthwise of said strip between said second point and the switch-actuating projection on said strip, said second part being adapted to engage the strip only when the adjusting means has been moved substantially to an extreme position usually corresponding to a positive switch-off condition. The effect of this second part in engaging the strip at the aforesaid third point, short of its free end and closer to the switch-actuating point than said second point at which the strip is normally engaged by the adjusting means, is to shorten the effective bendable length of the bimetal strip, thereby to require a very extreme change in temperature before the strip can bend far enough away from the switch so as to permit the switch to turn on. This produces a very significant safety factor, ensuring that the switch will remain off even if the temperature of the space to be heated falls markedly.

As has been mentioned, in many installations it is required that when the heating system is to be turned off, both sides of the heating system shall be disconnected from the power source. To this end, two switches are provided, one in each side of the line connected to the heating devices. A first of those switches is controlled in its cycling in accordance with the temperature setting of the thermostat when it is desired to maintain the room temperature at a predetermined value, and it is that first switch which is engaged and actuated by the bimetal strip in the present invention. It will be opened when the thermostat is adjusted to its extreme off condition, thus disconnecting one side of the heating circuit from the source of power. A second switch is provided between the heating devices and the other side of the line. This second switch is designed to be actuated, in accordance with the present invention, by yet another part carried by the arm or other manually adjustably positioned element, said other part engaging the second switch and moving it to closed position when the arm or other adjusting means is moved substantially to its extreme off position. The engagement between the arm-carried part and this second switch may be via an aperture formed in the bimetal strip. The actuation of this second switch is entirely independently of the temperature-responsive action of the bimetal strip. This, too, adds and appreciable factor of safety, since even if the bimetal strip should bend sufficiently to cause the switch which it controls to turn back on (an unlikely eventuality because of the strip-length-restricting action previously described) the external heaters will still remain de-energized because the second switch is positively retained in its off position.

In the preferred embodiment here specifically disclosed the pivotally mounted arm which is adapted to perform the adjustment and control functions has a first part which engages the strip adjacent its free end and carries a pair of additional protruding elements, each preferably adjustably mounted thereon, which are adapted respectively to engage the strip and limit its effective length and to engage and actuate the second switch when the assembly is adjusted to its extreme off condition.

To the accomplishment of the above, and to such other objects as may hereinafter appear, the present invention relates to a thermostat assembly construction and arrangement as defined in the appended claims and as described in this specification, in which:

FIG. 1 is a top plan view of a preferred embodiment of the present invention with the top cover removed;

FIG. 2 is a side cross-sectional view taken along the line 2—2 of FIG. 1 and with the top cover in place; and FIG. 3 is a schematic circuit diagram illustrating one embodiment of a system in which the thermostat of the present invention may be used.

Making reference first to FIG. 3, an external heating system designated by the reference numeral 2 is shown, which is adapted to be connected to a suitable source of electrical power 4 by means of lines 6 and 8, those lines being connected respectively to opposite ends of the heater 2 via switches 10 and 12 respectively. The switch 10 is here disclosed as the cycling switch which is adapted to be controlled directly by the bimetal strip 14, while the switch 12 is here disclosed as the switch which is adapted to be positively operated, independently of the bimetal strip 14, by the adjusting means generally designated 16 when the latter is in its extreme off position.

The thermostat assembly comprises a base plate or support 18 provided with mounting screws 20 for securing it to a wall or other mounting surface. The base plate 18 has at one end a pair of upwardly extending ears 22, and at its other end it has a substantially centrally located upwardly extending post 24. The bimetal strip is in the form of an elongated wide sheet having extending end portions 26 which are received within apertures 28 formed in the ears 22 so as to fix the position of the lefthand end (as viewed in drawings) of the strip 14 while permitting the strip to bend along its length. The end 30 of the strip remote from the portions 26 is free to move except as otherwise provided. The strip 14 carries, at some appropriate position along its length, a depending part 32 which is adapted to engage and actuate the switch 10.

The base plate 18 is provided with an opening 34 at least partially in registration with the part 32, within which an insulating shell 36 is received. The two switches 10 and 12 are appropriately mounted within the shell 36 in side by side position, the switch 10 having an actuating button 38 extending up therefrom into registration with, and adapted to be engaged by, the part 32 depending from the bimetal strip 14. The switch 12 is provided with a corresponding actuating button 38a. Each of the switches 10 and 12 is so constructed that when the button 38 is in its upper position, to which it is urged by some resilient means inside the switch assemblies 10 and 12, respectively, the switches 10 and 12 are in closed circuit condition, and when the actuating buttons 38 are depressed those switches are placed in open circuit condition.

Extending out from the sides of the post 24 are pivot pins 40 on which an arm 42 is pivotally mounted, that arm constituting a portion of the adjusting means 16. The arm 42 consists of two side parts 42a and 42b connected at their ends by a crosspiece 44 and connected intermediate their length by a crosspiece 46. An abutment crosspiece 48 extends between the arms 42a and 42b adjacent and facing the post 24. The cross piece 44 carries a pair of laterally displaced vertically oriented screws 50 and 52 which are adapted to extend down below the lower surface of the crosspiece 44 to adjustable extents. The crosspiece 46 carries at its lower surface a projecting portion 46a. The portion 46a is adapted to register with the free end 30 of the bimetal strip 14 so as to engage the latter and position it vertically as the arm 42 is pivoted. The screw 50 carried by the cross piece 44 is normally positioned above the upper surface of the strip 14 but is adapted to be brought down into engagement therewith as the arm 42 is pivoted in a counterclockwise direction as viewed in FIG. 2. The screw 52 carried by the crosspiece 44 and positioned laterally relative to the screw 50 is designed to register with an aperture 54 in the bimetal strip 14 and also to register with the actuating button 38a for the switch 12, so that when the arm 42 is pivoted in the aforementioned counterclockwise direction to an extreme position such that the screw 50 engages the upper surface of the strip 14, the screw 52 will have passed through the opening 54 and will have engaged and depressed the actuating button 38a of the switch 12.

The position of the arm 42 is controlled by the manual means generally designated 56. This comprises a shaft 58 threadedly passing through an opening 60 in the post 24 and carrying at its tip a second screw 62 which is adjustably projectable therefrom and is adapted to engage the abutment crosspiece 48 at a point higher than the pivot pins 40. The screw 62 is made adjustable in the screw shaft 58 for initial calibration purposes. The righthand end of the shaft 58 extends out from the post 24 and has an adjusting knob 64 made fast thereon in any appropriate manner, the periphery of that knob being provided with indicia 66 indicating the temperature to which the thermostat is designed to be adjusted. The degree of rotation of the knob 64 relative to the post 24 may be controlled and limited by a stop pin 68 which extends outwardly from the post 24 and is received within a slot 70 of appropriate circumferential length in the knob 64. A cover generally designated 72 is adapted to be received removably on the base plate 18 and to define therewith a chamber 74 within which the bimetal strip 14 and the adjusting arm 42 are received. Means may be provided for facilitating circulation of air through the chamber 74, as by providing appropriate apertures in the wall of the cover 72.

The manner of operation of the thermostat assembly here specifically disclosed is as follows: the bimetal strip 14 is designed to bend downwardly, as viewed in FIG. 2, upon temperature rise. In thus bending the part 32 carried thereby is adapted to engage the actuating button 38 of switch 10 and move it downwardly, opening the switch 10. The precise temperature at which the bimetal-carried part 32 is effective to open the switch 10 will be determined, under normal operating conditions, by the position of the free end 30 of the strip 14, and that in turn will be controlled by rotation of the knob 64, which will cause the arm 42 to pivot upwardly or downwardly and, via the crosspiece 46 and the depending portion 46a thereof, to correspondingly position the free end 30 of the bimetal strip 14. Thus, when the adjusting knob 64 is either in fully on condition or in any intermediate temperature control condition, the energization of the heater 2 will be controlled through the cycling of the switch 10 between on and off conditions. This is the normal mode of operation of a thermostat assembly of this type.

When the heater 2 is to be turned off, the knob 64 is rotated so as to screw the shaft 58 in as far as possible. This will cause the arm 42 to pivot in a counterclockwise direction toward an extreme position. When the arm 42 has substantially reached said extreme counterclockwise position, the screw 50 carried thereby will engage the upper surface of the strip 14 and clamp the thus-engaged strip portion vertically. The point at which the screw 50 thus engages the strip 14 is to the right of the part 32 carried by the strip but is to the left of the point where the strip is engaged by the portion 46a of the arm 42. As a result that portion of the bimetal strip which is permitted to bend and to control and actuate the switch 10 is greatly reduced in length. This means that before the strip 14 can bend upwardly enough to release the actuating button 38 for the switch 10 and thus permit that switch to turn back on, a very low temperature must be sensed by the strip 14, a lower temperature than would be necessary to turn the switch 10 back on had the bimetal strip had its original effective length as defined between its end portions 26 and 39. The action of the screw 50 on the bimetal strip 14 therefore provides a substantially positive "off" setting for the switch 10.

Substantially at the same time that the screw 50 engages the strip 14 as described above, the screw 52 carried by the arm 42 will have moved through the aperture 54 in the strip 14, engaged the actuating button 38a of the switch 12, and depressed that button, thereby opening the switch 12. As a result, when the thermostat is placed in its off condition, as by screwing the knob 64 and shaft 58 all the way in, the switch 12 is turned positively off through direct action between the knob 56 and the actuating button 38a, and the switch 10 is turned off with a great degree of security via the bimetal strip 14 because the effective operative length of that strip 14 has been reduced. This reduction in effective length of the strip 14 is also achieved positively through positioning of the knob 64.

The bimetal strip 14 is long and wide, presents a very large surface to the ambient atmosphere the temperature of which is to be sensed, and therefore constitutes a comparatively accurate and sensitive temperature-sensing element. It controls the cycling of the heater under normal operating conditions in conventional fashion. The novel portions of this invention have primarily to do with the positive-off features of the system, both in ensuring that switch 10 will not turn back on when that is not desired and, when a second switch 12 is provided, in ensuring that the second switch is positively turned off independently of the bimetal strip 14. Moreover, the switching off of the second switch 12 is independent of the swtiching off of the switch 10, so that even if the strip 14 should break or bend and permit the switch 10 to turn back on, the heater 2 will still not be energized because the switch 12 will be held positively off.

While but a single embodiment of the present invention has been here specifically disclosed, it will be apparent that many variations can be made therein, all within the scope of the following claims.

We claim:
1. A thermostat comprising a support, a switch mounted thereon and having an actuating element, a bimetal strip assembly spaced from switch actuating part, said assembly including a part movable relative to said switch actuating element, thereby to actuate and de-actuate said switch, as said bimetal strip changes shape with changes in temperature, said strip assembly being mounted on said support at a first point spaced from said part and extending to a second point on the opposite side of said part from said first point, and temperature adjusting means on said support and engageable with said strip assembly at said second point for adjusting the position thereof relative to said actuating element, said adjusting means having an operative position near one end of its range of adjustment in which said strip assembly is moved thereby relative to said actuating element to a predetermined degree, and strip restraining means operatively connected to said adjusting means and movable thereby, substantially only when said adjusting means is in said operative position, into operative engagement with said strip assembly at a third point located axially of said strip assembly between said second point and said part, thereby being effective to reduce the operative temperature-responsive length of said strip assembly when said adjusting means is in said operative position.

2. The thermostat of claim 1, in which said adjusting means comprises an arm articulately mounted on said support and movable toward and away from said strip assembly, and manual means active on said arm to thus move it, said arm carrying a first part engaged with said strip assembly at said second point substantially throughout the range of adjustment of said adjusting means, and said arm carrying a second part engageable with said strip assembly at said third point substantially only when said adjusting means is in said operative position.

3. The thermostat of claim 2, in which said second part is adjustably mounted on said arm.

4. The thermostat of claim 2, in which said arm is mounted on said support to be pivotable about an axis, said first part being located closer to said axis than said second part.

5. The thermostat of claim 2, in which said arm is mounted on said support to be pivotable about an axis, said first part being located closer to said axis than said second part, said second part being adjustably mounted on said arm.

6. The thermostat of claim 1, in which said thermostat comprises a second switch with an actuating element mounted on said support, said adjusting means comprising an auxiliary part operatively engaged with said actuating element for said second switch substantially only when said adjusting means is in said operative position and then effective to determine the condition of said second switch.

7. The thermostat of claim 6, in which said strip assembly is interposed between said auxiliary part and said actuating element for said second switch and has an aperture in registration therewith through which said auxiliary part is adapted to pass.

8. The thermostat of claim 6, in which said strip assembly is interposed between said auxiliary part and said actuating element for said second switch and has an aperture in registration therewith through which said auxiliary part is adapted to pass, the position of said auxiliary part relative to said adjusting means being adjustable.

9. The thermostat of claim 6, in which the position of said auxiliary part relative to said adjusting means is adjustable.

10. The thermostat of claim 1, in which said adjusting means comprises an arm articulately mounted on said support and movable toward and away from said strip assembly, and manual means active on said arm to thus move it, said arm carrying a first part engaged with said strip assembly at said second point substantially throughout the range of adjustment of said adjusting means, and said arm carrying a second part engageable with said strip assembly at said third point substantially only when said adjusting means is in said operative position, and in which said thermostat comprises a second switch with an actuating element mounted on said support, said adjusting means comprising an auxiliary part carried by said arm and movable thereby into engagement with said actuating element for said second switch substantially only when said adjusting means is in said operative position and then effective to determine the condition of said second switch.

11. The thermostat of claim 10, in which said strip assembly is interposed between said auxiliary part and said actuating element for said second switch and has an aperture in registration therewith through which said auxiliary part is adapted to pass.

12. The thermostat of claim 10, in which said strip assembly is interposed between said auxiliary part and said actuating element for said second switch and has ar aperture in registration therewith through which said auxiliary part is adapted to pass, the position of said auxiliary part relative to said adjusting means being adjustable.

13. The thermostat of claim 10, in which the position of said auxiliary part relative to said adjusting means is adjustable.

14. The thermostat of claim 1, in which said adjusting means comprises an arm articulately mounted on said support and movable toward and away from said strip assembly, and manual means active on said arm to thus move it, said arm carrying a first part engaged with said strip assembly at said second point substantially throughout the range of adjustment of said adjusting means, said arm carrying a second part adjustably mounted thereon and engageable with said strip assembly at said third point substantially only when said adjusting means is in said operative position, and in which said thermostat comprises a second switch with an actuating element mounted on said support, said adjusting means comprising an auxiliary part carried by said arm and movable thereby into engagement with said actuating element for said second switch substantially only when said adjusting means is in said operative position and then effective to determine the condition of said second switch.

15. The thermostat of claim 14, in which said strip assembly is interposed between said auxiliary part and said actuating element for said second switch and has an aperture in registration therewith through which said auxiliary part is adapted to pass.

16. The thermostat of claim 14, in which said strip assembly is interposed between said auxiliary part and said actuating element for said second switch and has an aperture in registration therewith through which said auxiliary part is adapted to pass, the position of said auxiliary part relative to said adjusting means being adjustable.

17. The thermostat of claim 14, in which the position of said auxiliary part relative to said adjusting means is adjustable.

18. The thermostat of claim 1, in which said adjusting means comprises an arm articulately mounted on said support and movable toward and away from said strip assembly, and manual means active on said arm to thus move it, said arm being mounted on said support to be pivotable about an axis, said arm carrying a first part engaged with said strip assembly at said second point substantially throughout the range of adjustment of said adjusting means, and said arm carrying a second part engageable with said strip assembly at said third point substantially only when said adjusting means is in said operative position, and in which said thermostat comprises a second switch with an actuating element mounted on said support, said adjusting means comprising an auxiliary part carried by said arm and movable thereby into engagement with said actuating element for said second switch substantially only when said adjusting means is in said operative position and then effective to determine the condition of said second switch.

19. The thermostat of claim 18, in which said strip assembly is interposed between said auxiliary part and said actuating element for said second switch and has an aperture in registration therewith through which said auxiliary part is adapted to pass.

20. The thermostat of claim 18, in which said strip assembly is interposed between said auxiliary part and said actuating element for said second switch and has an aperture in registration therewith through which said auxiliary part is adapted to pass, the position of said auxiliary part relative to said adjusting means being adjustable.

21. The thermostat of claim 18, in which the position of said auxiliary part relative to said adjusting means is adjustable.

22. A thermostat comprising a support, a switch mounted thereon and having an actuating element, a bimetal strip assembly spaced from said switch actuating part, said assembly including a part movable relative to said switch actuating element, thereby to actuate and de-actuate said switch, as said bimetal strip changes shape with changes in temperature, said strip assembly being mounted on said support at a first point spaced from said part and extending to a second point on the opposite side of said part from said first point, and temperature adjusting means on said support and engageable with said strip assembly at said second point for adjusting the position thereof relative to said actuating element, said adjusting means comprising an arm articulately mounted on said support and movable toward and away from said strip assembly, and manual means active on said arm to thus move it, a second switch having an actuating element mounted on said support, and an auxiliary part carried by said arm and operatively engaged with said actuating element for said second switch substantially only when said adjusting means is in an operative position near one end of its range of adjustment and then effective to determine the condition of said second switch.

23. The thermostat of claim 22, in which said strip assembly is interposed between said auxiliary part and said actuating element for said second switch and has an aperture in registration therewith through which said auxiliary part is adapted to pass.

24. The thermostat of claim 22, in which said strip assembly is interposed between said auxiliary part and said actuating element for said second switch and has an aperture in registration therewith through which said auxiliary part is adapted to pass, the position of said auxiliary part relative to said adjusting means being adjustable.

25. The thermostat of claim 22, in which the position of said auxiliary part relative to said adjusting means is adjustable.

References Cited

UNITED STATES PATENTS

| 2,613,298 | 10/1952 | Armstrong | 200—139 |
| 3,189,713 | 6/1965 | Randolph | 200—139 |
| 3,223,807 | 12/1965 | Grahl | 200—139 |

BERNARD A. GILHEANY, *Primary Examiner.*

R. COHRS, *Assistant Examiner.*

U.S. Cl. X.R.

337—340, 349